INVENTOR.
JAMES L. RODGERS
BY
Mueller Aichele & Rauner
ATTORNEYS

United States Patent Office 3,520,200
Patented July 14, 1970

3,520,200
MOVEMENT RESPONSIVE APPARATUS
James L. Rodgers, Tempe, Ariz., assignor to Motorola, Inc., Franklin Park, Ill., a corporation of Illinois
Filed Oct. 3, 1967, Ser. No. 672,503
Int. Cl. G01p 15/02
U.S. Cl. 73—517                    19 Claims

ABSTRACT OF THE DISCLOSURE

A cylindrical assembly with plural conductor rods spaced apart around the periphery and an insulator center core having outwardly flared portions adjacent the axial ends of the assembly. A conductive sphere is disposed between the rods and the center core. Upon movement, the ball moves from between two rods to between another two rods. The flared ends limit the axial travel of the sphere such that the position between the rods is always the same irrespective of the position of the assembly. Detector circuits are provided that require the ball to actuate the circuit and then upon further movement to additional rods the movement is indicated. A two-step operation is provided, that is, the sphere must move from resting between one set of rods (condition) to between two different sets of rods (actuate).

BACKGROUND OF THE INVENTION

This invention relates to acceleration detectors and indicators and particularly to an improved detector system which is relatively insensitive to position and one which requires a two-step operation.

Acceleration detectors and indicators have a wide variety of applications including security instruments such as detecting tampering with portable devices. Many of the acceleration or movement indicators today are attitude or positional sensitive. That is, if the device is in a first attitude it will take a certain disturbance to actuate it while if in a second attitude a much smaller disturbance is required to actuate it. Therefore, some of the devices have been subject to a so-called supersensitivity to falsely indicate tampering with the device being secured. Further, many of the devices have been made movement responsive using small parts which are subject to damage by shock. An air-drop apparatus, for example, shock upon landing may be 100 g. Such shock damage may prevent the device from being actuated upon subsequent tampering. An example of such device is an air-dropped radio beacon. Therefore, it is desired to have a movement detector which is resistant to damage from shock. Further, it is desired that movement detector be settable to a minimum threshold of actuation.

Many of the acceleration or movement detectors are of the electrical actuated type having a mechanical type switch actuating an electrical circuit. Some of these movement detectors are held inactive for long periods of time and when in certain environments are subject to dust and corrosion effects causing a high resistance in the contacts. This high resistance may be sufficient in certain cases to actuate the device and falsely indicate tampering. A two-step actuation procedure can obviate this latter problem.

SUMMARY OF THE INVENTION

It is an object of the present invention to provide an improved movement or acceleration detector that is resistant to certain shock levels and requires movement for actuation irrespective of corrosion and other interfering matter in the detector.

Apparatus incorporating the teachings of the present invention include the features of a cylindrical assembly having a plurality of spaced-apart electrically conductive rods disposed around the periphery with a conductive sphere resting between any two of the rods for making an electrical connection therebetween. A predetermined movement or acceleration of the cylinder causes the sphere to move from between the two rods breaking the circuit and making another circuit. This action is used to detect and indicate movement of the cylindrical assembly. Another feature is the provision of a center core in the assembly having outwardly flared edges at the opposite axial ends of the assembly and arranged such that the sphere will engage the outward flaring ends to maintain the same position between the two rods anywhere along their length. Such co-action provides a minimum threshold for moving the sphere from between the two conductive rods to between another set of conductive rods. Another feature is the provision of annular metal bands on the flared edges which in connection with the rods form an electrical circuit for indicating whether or not the sphere is engaging the flared edges and therefore is usable as a position detector for the cylindrical assembly.

Another feature of the present invention is the provision of detector circuits which require the breaking of an electrical circuit, such as the sphere, to moving away from a first pair of conductor rods to another pair of conductor rods, before indicating movement. Resting on the first pair conditions the detector circuit while the movement to and completing an electrical circuit in the second pair of conductive rods actuates the circuit to indicate movement in joint response to the conditioning and the making of the second electrical circuit. Still other features of the invention include the provision of counting the number of accelerations of movements to provide a rate indication and also to provide an indication of the amount of movement and also a latch circuit may be provided to supply continuous rather than a pulse indication of movement of the cylindrical housing.

Another feature is the provision in a detector circuit of two successively occurring and distinct electrical states for actuation of an indicating device.

THE DRAWING

DESCRIPTION OF THE ILLUSTRATIVE EMBODIMENTS

Figure 1:
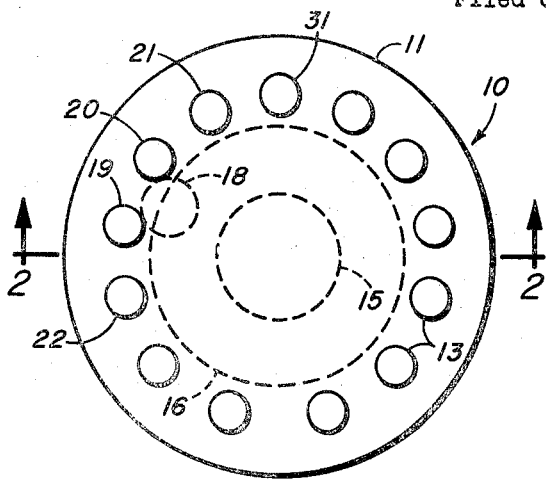
FIG. 1 is a plan view of a cylindrical assembly constructed according to the teachings of the present invention.
Figure 2:
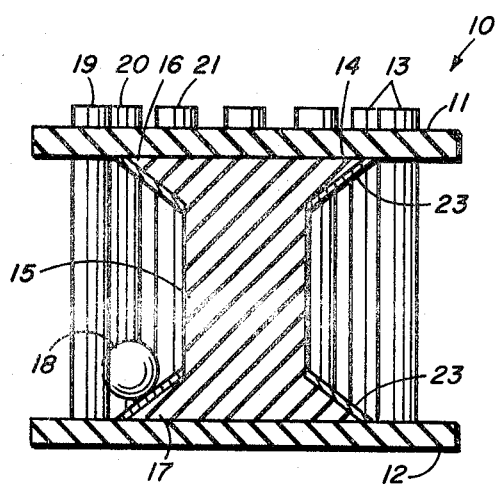
FIG. 2 is a sectional view taken in the direction of the arrows along line 2—2 in FIG. 1.

Referring now more particularly to the drawing, like numbers indicate like parts and structural features in the various views and schematic diagrams. Referring firstly to FIGS. 1 and 2, there is illustrated a cylindrical assembly 10 capable of detecting accelerations or movements of a device (not shown) to which it may be attached. The assembly 10 includes the axial insulating end members 11 and 12 joined together by a plurality of peripherally spaced-apart axially-extending electrically-conductive rods 13 and a center insulating core 14. Core 14 includes a central axial portion 15 having a reduced radius plus the outwardly flared end portions 16 and 17 which cooperate with the conductive sphere 18 to provide a minimum threshold of actuation. As shown, sphere 18 is resting between a first pair of peripheral spaced-apart rods 19 and 20 and is resting on the lower outwardly flared end portion 17. It may be noted that sphere 18 extends between the rods 19 and 20 a certain distance. End portions 16 and 17 are preferably formed such that when the sphere 18 is contacting the flared portions and the two rods 19 and 20 the position between the rods will be the same as if the sphere 18 was contacting the rods midway between the end members 11 and 12. Without flared end portions 16 and 17, sphere 18 could rest on the end member 12, for example, and extend between rods 19 and 20 a shorter distance to make it more sensitive to movement or acceleration. In fact, the circuit formed between rods 19 and 20 by sphere 18 could be broken when the cylindrical assembly is positioned as shown in FIG. 2 if flared end portions 16 and 17 were not provided. It may be noted that sphere 18 when moving from between the first pair of conductor rods 19 and 20 to a second pair 20 and 21 will first break the electrical circuit between the rods 19, 20 and then make an electrical circuit between rods 20 and 21. The same is true for movement of sphere 18 in the opposite direction where it makes an electrical circuit between the second pair of rods 19 and 22. As will become apparent, conductive sphere 18 may initially rest between any pair of rods 13 and upon moving to between any other pair of rods indicates movement of the cylindrical assembly.

It may be desired to indicate through electrical circuits, later described, whether or not cylindrical assembly 10 is in the position illustrated in FIG. 2 or whether it is resting on the circular periphery such that, for example, rod 19 is at the bottom. To this end, annular conductive bands 23 may be formed on the outwardly flared end portions 16 and 17, as shown, such that the flared portions or metal bands 23 terminate radially inward of rods 13 such as not to make electrical connection therewith. When sphere 18 is resting against an outwardly flared portion 16 or 17, an electrical circuit is completed between the rods 13 and the respective metal bands. Upon movement of the sphere, for example, from between rods 19 and 20 to between rods 20 and 21, electrical circuit between rod 19 and metal band 23 is temporarily broken in the same manner as it is broken between rod 19 and 20. To further facilitate position indication, rods 13 may be provided with a slightly outwardly bowing such that when assembly 10 is lying on its side sphere 18 will roll downwardly to a point midway between the end members 11 and 12.

From inspection of FIGS. 1 and 2, it may be noted that the construction of the mechanical portion of the movement detector built according to this invention is relatively simple, has only one moving part, i.e., conductive sphere 18, and can be easily constructed to be rugged such as to prevent damage thereto by impact-caused shock. While a circular cylindrical assembly 10 is illustrated, no limitation thereto is intended. For example, an oblate or oblong shape can be provided wherein it is desired to have varying degrees of sensitivity to movement in accordance with the positional attitude of the assembly (not shown) to which the cylindrical can is attached. Such varied sensitivity is explained later with respect to FIG. 6.

Figure 3:
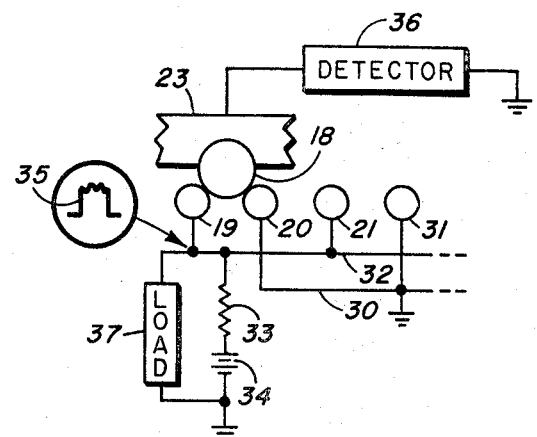
FIG. 3 is a schematic diagram of one way of connecting a detector circuit to the FIG. 1 illustrated assembly.

Referring next to FIG. 3, there is shown in schematic form a simple detector circuit usable with the FIGS. 1 and 2 illustrated apparatus. Rods 13 are diagrammatically illustrated by circles 19, 20, 21, 22 and 31 as well as is sphere 18. Alternate ones of the rods 13 are connected to a reference potential line 30, which is shown as connected to ground reference potential. In FIG. 3 alternate rods 20 and 31 are commonly joined together with line 30 connecting every other, or alternate, one of all rods 13. The other set of alternate ones of rods, i.e., 19, 21, etc. are commonly connected to signal or actuating line 32. Line 32 in turn is connected through electrical resistor 33 to a battery source 34 which in turn is connected to ground reference potential. When conductive sphere 18 is resting between rods 19 and 20, line 32 is connected directly to line 30 which effectively grounds line 32. This connection shorts out load 34 causing zero voltage thereacross. When a movement or acceleration actuates sphere 18 to move toward rod 21, the electrical circuit from rod 19 to rod 20 is opened immediately causing the voltage supplied by source 34 to increase, as indicated by square wave 35, immediately supplying a current impulse through load 34. This current impulse indicates to load 34 that sphere 18 is being moved. Load 34 may consist of an electrical counter, comparator, or any other type of current or voltage responsive device.

It is shown that conductive sphere 18 is resting on the conductive annular metal band 23. Band 23 in turn is connected to electrical circuit detector 36, having the other end connected to ground reference potential. Whenever, since sphere 18 is resting on and contacting a reference rod 20, 31, etc. and is resting on metal band 23, an electrical circuit is completed between bands 23 and ground reference potential providing a low impedance path. This low impedance path is detected by detector 36 as indicated, and the position of assembly 10 is indicated as that being shown in FIG. 2. When sphere 18 is intermediate the flared ends 16 and 17 (FIG. 2), then no circuit is provided and high impedance is presented to detector 36. Detector 36 may consist of any known circuits usable to detect high and low electrical impedance paths, many of which are well known in the art.

One problem with the FIG. 3 system is that after conductive sphere 18 has rested on rods 19 and 20 a sufficiently long period of time, corrosion and other effects may cause a high impedance contact between the sphere and the two rods. As a result, a perfect ground connection from line 32 to line 30 is no longer provided and some signal will be provided from source 34 to load 37 which after a period of time may falsely indicate movement. Therefore, it is desired to provide a movement detector and indicator which requires the detector circuit to be conditioned for actuation, as by completing or opening an electrical circuit for a predetermined time; and then in a second step make a second electrical circuit between rods 20 and 21, for example. To this end, the circuits illustrated in FIGS. 4 and 5 are constructed.

Figure 4:
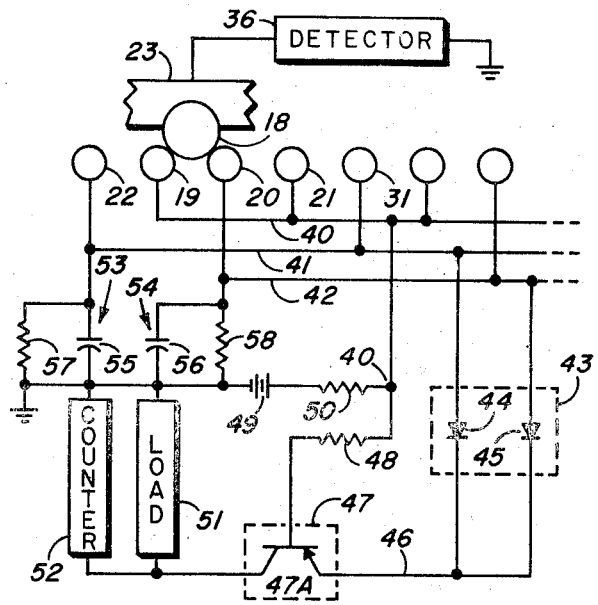
FIG. 4 is a schematic diagram detector circuit in accordance with the present invention shown connected schematically to the FIG. 1 apparatus and which requires the conductive sphere to move two positions for supplying and indication of movement.
Figure 5:
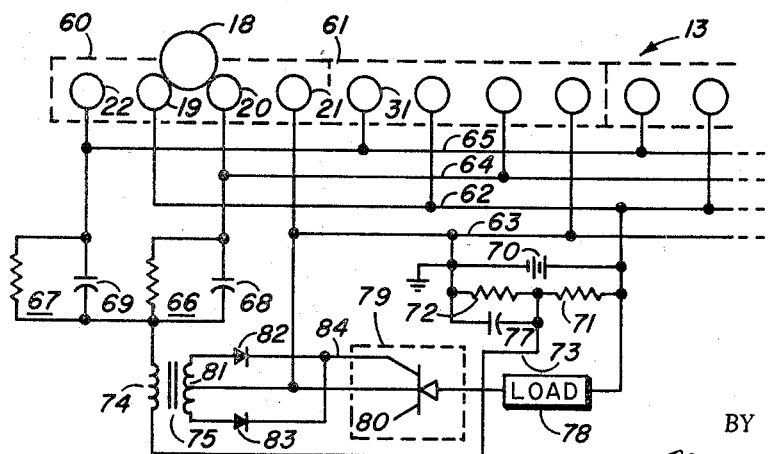
FIG. 5 is a schematic diagram of another embodiment of a detector circuit and includes the same features as FIG. 4 embodiment plus greater sensitivity.

Referring next to FIGS. 4 and 5, there are illustrated in schematic diagram form two detector circuits which are connectable to the FIG. 1 illustrated assembly which have a two-step movement detection cycle which may consist of condition and actuate steps. For these circuits to indicate a movement of sphere 18, conductive sphere 18 must initially repose between and electrically contact one pair of adjacent rods 13, as shown in FIG. 2. The two circuits, as shown, are designed such that if conductive sphere 18 is kept in continuous rolling motion around the periphery of assembly 10, no output signal will be provided from either of the two circuits. However, if the sphere is allowed to come to rest for a time determined by a time constant, later described, designed into the electrical circuit and a subsequent movement is provided, an output signal will be supplied indicating movement. The movement of sphere 18 is the actuating step. The FIGS. 4 and 5 circuits may be constructed as a printed or microelectronic circuit on either of end members 11 or 12. Both the FIG. 4 and FIG. 5 circuits are automatically resettable requiring only that the assembly 10 stop motion momentarily and then restart motion to condition and actuate the illustrated circuits.

Referring specifically to FIG. 4, there is provided reference line 40 connected to alternate ones of the rods 13, for example, electrically connected to rods 19, 21, etc., around the periphery of assembly 10. Two actuating lines 41 and 42 are provided. Line 41 is connected such that ground reference potential may be supplied thereto when the connected rods are not contacted by the conductive sphere 18. For example, line 41 is connected to every fourth rod, for example, rods 22 and 31, etc., around the periphery of assembly 10. Reference line 40 has a positive potential thereon when conductive sphere 18 is not contacting any of its connected rods. Line 42 is also connected to every fourth rod in the interstices between the line 41 rod connections; for example, line 42 is connected to rod 20 and then every fourth rod around the periphery of assembly 10. Therefore, it is seen that in the FIG. 4 embodiment reference line 40 is connected to every other rod with two separate actuating lines 41 and 42 being connected to alternate rods intermediate the reference line connected rods. Also, line 40 is the sole power supply connection to the detector circuit. The actuating signals, later described, supplied over lines 41 or 42 are supplied through isolating circuit 43 consisting of two unidirectional current conducting devices or diodes 44 and 45, respectively connected to lines 41 and 42 and having a common output line 46. Line 46 supplies the actuating signals to electroresponsive circuit means 47 which may consist of a single PNP transistor 47A, for example. The base electrode of transistor 47A receives the reference potential from line 40 through electrical resistor 48. The base-to-emitter junction of transistor 47A compares the potential on line 46 with that provided on line 40. When the potential on line 46 is greater, i.e., more positive, than the line 40 potential, an output signal is supplied to load 51 and to alternate load or counter 52, later described.

Electrical energy is supplied by battery source 49 through resistor 50 to line 40. Energy storage and timing circuits 53 and 54 are respectively connected to lines 41 and 42 to provide control and actuating signals thereto in response to movement of conductive sphere 18. The circuits comprise an RC circuit consisting of capacitors 55 and 56, respectively, and resistors 57 and 58, respectively. When conductive sphere 18 is positioned, as shown, forming an electrical circuit between rods 19 and 20, battery source 49 is connected therethrough to line 42 to provide a positive potential, for example, 10 volts, to charge capacitor 56 to that voltage. The circuit then is completed by resistor 58 to provide voltage divider action with resistor 50. When conductive sphere 18 moves in either direction such as to break the electrical circuit between rods 19 and 20, the positive 10 volts remain on line 42 and continue to be supplied through diode 45 to line 46. Diode 44 serves to isolate or block the voltage from line 41. As soon as sphere 18 makes a new circuit, for example, either between rod 19, the reference potential connection, and rod 22, capacitor 55 cannot change its voltage immediately; therefore, it momentarily forces the line 40 voltage to ground reference potential. Circuit means 47 immediately senses that the potential on line 40 is less than that on line 46 and supplies an electrical current signal to load 51. Capacitor 55 is charged by battery source 49 and capacitor 56 begins discharging through diode 45 and circuit means 47, the circuit means responds to become nonconductive terminating the current signal to load 51. Therefore, it is seen that an electrical impulse is provided to load 51 as an indication that sphere 18 has moved from between rods 19 and 20 to between rods 19 and 22. In the above-described operation the sphere 18 resting between rods 19 and 20 and serving to form a connection for charging capacitor 56 to a predetermined +10 volts acts as a conditioning step for the circuit. On breaking the circuit, capacitor 56 holds the voltage in line 42 and as soon as the new circuit between rods 19 and 22 is made, capacitor 55 keeps the reference line voltage at a ground reference potential such that an actuating signal is then supplied to cause means 47 to indicate movement.

For movement in the opposite direction, sphere 18 moves from between rods 19 and 20 to between rods 19 and 21. In this situation no output signal is provided. Therefore, in using this circuit, the assembly 10 is designed such that sphere 18 will always move at least two positions, that is, from the illustrated position in FIG. 4 to at least between rods 21 and 31. The same is true in the opposite direction; however, the momentary contact between 19 and 20, as sphere 18 is rolling thereacross, is sufficient to actuate the circuit to supply the above-described output pulse signal to load 51. The pulses in the load are counted by the counter 52. As will become apparent from a FIG. 5 embodiment, there is provided reference connections such that conductive sphere 18 rolling from one pair of rods, 19, 20, to a second pair of rods, 20, 21 or 19, 22 will always actuate the circuit. The FIG. 4 circuit may be redesigned to respond in the manner as will be described for FIG. 5.

Also shown in FIG. 4 are annular metal bands 23 connected to sphere 18 and thence rods 19 and 20 to complete a circuit through ground reference potential to detector 36 for detecting and indicating position of the assembly 10 as described with respect to the FIG. 3 circuit. It will be appreciated that detector 36 will have to take a different configuration from FIG. 3 configuration since it will have to detect a relatively positive voltage on line 40 with respect to ground reference potential rather than a ground reference potential, per se.

Referring next to FIG. 5, there is shown another embodiment of a detector circuit wherein conductive sphere 18 is required only to move from one pair of rods, for example, 19 and 20, to a second pair of rods in either direction, for example, rods 20, 21 or rods 19 and 22, to actuate the detector circuit. In this embodiment rods 13 are grouped into sets of four such as set 60 and 61. In each set of four rods 13 there are connected to alternate ones a pair of reference lines 62 and 63 connected as shown in set 60 to rods 19 and 21. Interspersed with such reference line connections there are connected two actuating lines 64 and 65 connected, respectively, to rods 20 and 22. Reference lines 62 and 63 have different potentials thereon such that a difference reference to each of the actuating lines 64 and 65 is provided for actuating the circuit by supplying thereto opposite polarity actuating signals. By splitting the reference line as described for this FIG. 5 circuit in the FIG. 4 circuit, similar results can be obtained.

FIG. 5 circuit includes the energy storage and timing circuits 66 and 67 constructed in the same manner as circuits 53 and 54 of FIG. 4 and including storage capacitors 68 and 69, respectively. Battery source 70 is connected between ground reference potential on line 63 and positive voltage reference line 62, as shown. Therefore, line 62 will always have +10 volts, for example, while line 63 is always maintained at ground reference potential. Voltage divider consisting of resistors 71 and 72 provides an intermediate reference potential over line 73 and through primary winding 74 of transformer 75 to the common end 76 of circuits 66 and 67. By-pass capacitor 77 is connected across resistor 72 to ground reference potential. A load 78, such as a counter or other electro-responsive devices, is connected between line 62 and the electro-responsive circuit means 79, in this case illustrated as a silicon-controlled rectifier (SCR) 80. Silicon-controlled rectifier acts as a latch circuit for holding a continuous indication of movement once sphere 18 has moved from one pair of rods 13 to a second pair of rods. If the load is a counter, it will count the number of times the SCR 80 is made conductive. It is understood that the momentary response of circuit means 47 (FIG. 4) may be substituted for the circuit 79 and vice versa, SCR 80 is actuated by a pulse signal supplied by transformer 75 through its output center-tap winding 81 as connected through the full wave rectifying diodes 82 and 83 to common line 84 which is connected to the gate electrode of SCR 80. Winding 81 center tap and SCR 80 cathode are both connected to ground reference potential. It may be noted that circuit means 79 in this particular instance does not operate on a comparison basis; rather, it is actuated by a signal on line 84. Further, since sphere 18 must move from between one pair of rods to between a second pair of rods, together with the flared end portions 16 and 17, a minimum acceleration or movement for actuation is provided.

Actuation of the circuit by movement of conductive sphere 18 after the circuit has been conditioned from between the pair of rods 19, 20 to the second pair of rods 19, 22 will be first described. In the conditioning step sphere 18 is between rods 19 and 20 to provide an electrical circuit between rods 19 and 20 and thereby connects line 62 to positive 10 volts to line 64 which serves to charge capacitor 68 positive 10 volts. When capacitor 68 is fully charged, the circuit is conditioned. Therefore, a 10-volt voltage differential is provided thereacross, making line 76 negative 10 volts with respect to line 64 as provided through voltage divider 71 and 72. Also note that capacitor 77 is charged to an intermediate voltage maintaining the voltage on line 73 at a constant potential in the event of transients being supplied to line 73. Assume that the sphere 18 is moving from rods 19 and 20, then capacitor 68 holds the 10-volt charge thereacross. As soon as sphere 18 makes an electrical connection between rods 19 and 22, capacitor 69 prevents an immediate voltage change passing a positive going spike or pulse to line 76 which is then supplied through transformer 75 to make diode 82 conductive and thereby causing SCR 80 to become conductive to provide a current path to load 78. Once SCR 80 is initiated to current conduction, it remains current conductive until the circuit through load 78 is broken by known means.

The actuation of the circuit when conductive sphere 18 moves from between rods 19 and 20 to between rods 20 and 21 will now be described. The initial operation is the same as above described, however, when the electrical circuit between rods 20 and 21 is closed ground reference potential is immediately supplied to line 64. This action generates a negative going transient which will be passed by capacitor 68 to primary winding 74. Transformer 75 passes the transient to tapped winding 81 inducing a positive signal therein for biasing diode 83 to provide a positive going signal on line 84 actuating SCR 80 to current conduction as described in the previous paragraph. Therefore, it is seen conductive sphere 18, in moving from between rods 19 and 20 in either direction, will actuate the FIG. 5 circuit.

When conductive sphere 18 is initially resting between pair of rods 19, 22, then the circuit is actuated because capacitor 69 is charged to the 10 volt and capacitor 68 is discharged. By known circuit tracing techniques, it can be easily determined that the actuation of the circuit in FIG. 5 will be the same irrespective of which pair of rods conductive sphere 18 initially resides between. It is to be understood that detector 36 and metal band 23 may be utilized with the FIG. 5 circuit using known design techniques.

Counter 52 shown in FIG. 4 is utilized to count the number of output pulses provided by circuit means 47 to indicate the number of rods 13 which conductive sphere 18 has moved. Also, detector 36 may have a counter to count the number of circuit makes and breaks between metal band 23 and rod 13 to indicate distance of travel of sphere 18 as well as rate. In other words, detector 36 may include a rate detector such as a differentiator of known design to indicate the rate of movement.

Figure 6:
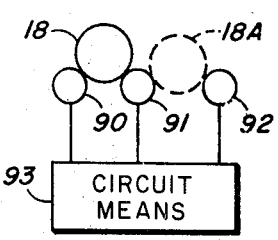
FIG. 6 is a diagrammatic showing of one way to alter sensitivity of the FIG. 1 device.

The sensitivity of assembly 10 and the illustrated circuits in this application may be varied by altering the relative size of the conductive sphere 18 with respect to the diameter of rod 13 as well as the spacing between adjacent rods. As shown in FIGS. 1 and 2, the spacing between the rods is equidistance around the periphery of the assembly and the rods are of equal diameter. As shown in FIG. 6, the conductive sphere 18 may be initially resting between a pair of rods 90 and 91 which are spaced closer together than the adjacent rods 91 and 92. From inspection of FIG. 6, it can be seen that the sphere 18 will more easily roll from between rods 90 and 91 than between the further spaced apart rods 91 and 92 as indicated by the position of sphere 18 by numeral 18A in dotted line form. By making the diameter of conductive sphere 18 smaller with respect to the diameter of rods 13 and assuming that the spacing between adjacent rods is maintained equal, it will take a greater movement of the sphere 18 whereas if the diameter of sphere 18 is increased with respect to the diameter of rod 13, less movement will be required to actuate the assembly. By accurately placing assembly 10 into a device, the acceleration of movement which is to be detected, a circuit means 93 may be connected as shown; such circuit means being either the FIG. 4 or FIG. 5 circuit, for example, may be used to detect the direction of motion of the device. For example, as previously mentioned, assembly 10 may be made ovate. By making the assembly ovate, the effective spacings between the rods at the sharper curved portions are somewhat less than along the major axis of the oral. This change serves to slightly alter the sensitivity of the device in that the sphere 18 will roll more easily from the closer together rods.

What is claimed is:

1. Movement responsive apparatus, including in combination,
   first and second axially spaced-apart insulating members,
   a plurality of spaced-apart electrically conductive rods disposed along the periphery of said members and joining the two members together to form a cylindrical assembly,
   an insulating core coaxially disposed between said members and having radially-outwardly flared axial end portions immediately adjacent said members and being radially inward of said rods, and
   an electrically conductive sphere disposed between said core and said rods and being free to move.

2. The apparatus of claim 1 wherein said flared portions being such that said sphere remains between adjacent rods to the same extent irrespective of the attitude of the assembly.

3. The apparatus of claim 1 further including annular metal plates respectively disposed on said flared portions.

4. The apparatus of claim 1 wherein said members are circular in configuration and said rods are spaced equidistantly apart one with respect to the other.

5. The apparatus of claim 1 wherein said rods are spaced unevenly apart for providing a variation in acceleration responsiveness.

6. The apparatus of claim 1 further including a circuit means having first, second and third connections, said first connection being connected to alternate ones of said rods leaving intermediate rods, said second connection being connected to alternate ones of said intermediate rods leaving remaining rods and said third connection being connected to all of said remaining rods, means to prepare said circuit for operation as an indicator when said sphere contacts a rod connected to said first line and a rod connected to one of said second and third lines and means to cause said circuit to provide an indication when said sphere contacts a rod connected to said first line and the other of said second and third lines.

7. The apparatus of claim 6 wherein said means to prepare said circuit for operation includes a capacitor, and means for placing said capacitor in a predetermined electrical state by said sphere reposing between said any two adjacent rods.

8. The apparatus of claim 7 and further including a pair of annular metal bands respectively disposed on said flared portions and detector means connected to said flared portions for detecting when said conductive sphere is contacting any rod connected to said reference line plus said metal band.

9. The apparatus of claim 7 further including a second capacitor, said second and third connections being connected respectively to a terminal of said first mentioned and said second capacitors,
a reference line connected to said first connection,
a voltage source,
said other terminal of said capacitors being connected to said reference line by way of a voltage source, and
voltage comparison means having an input terminal, a reference terminal and an output terminal,
said input terminal being connected to said second and third connection and said reference terminal being connected to said reference line and said output terminal being connected to a load.

10. The apparatus of claim 9 in which said load includes a counting device.

11. The apparatus of claim 9 wherein a pair of diodes respectively connect said second and third connectors to the input terminal of said comparison device.

12. The apparatus of claim 11 wherein said voltage comparison means comprises a transistor having a base and emitter and a collector, said base being connected to said reference line and said emitter being connected by way of said respective diodes to said first and second connections and said collector being connected to said load.

13. The apparatus of claim 12 wherein said rods are spaced unevenly apart for providing a variation in responsiveness of the assembly to accelerations.

14. The apparatus of claim 12 wherein said reference line is the sole power supply connection to said circuit means.

15. The apparatus of claim 1 wherein said conductive rods are arranged in sets of rods with each set having first, second, third, and fourth rods serially arranged in that order on the periphery of said assembly,
the respective first rods, second rods, third rods, and fourth rods being interconnected together,
voltage supply means having first and second terminals at different potentials and being respectively connected to said second and fourth rods,
first and second actuating lines respectively connected to said first and third conductive rods,
capacitive voltage storage means connected to each of said actuating lines for storing voltage in accordance with location of said sphere,
signal responsive means including load means connected across said voltage supply means and responsive to a change in voltage storage in said voltage storage means as caused by movement of said sphere making different circuit connections between said rods to indicate movement of said conductive sphere.

16. The apparatus of claim 15 wherein said voltage storage means have a common connection,
full-wave rectifying means receiving signals from said common connection in accordance with changes of circuit connections by said sphere and operative to supply signals indicative of said circuit changes as reflected in the changes in voltage storage in said storage means, and
means to connect said signals produced by said full-wave rectifying means to said signal responsive means to complete an electrical current path including said voltage supply means and said load means.

17. The apparatus of claim 16 wherein said electroresponsive means comprises controlled rectifier means having a gate electrode connected to said rectifying means and other electrodes respectively connected to said load means and voltage supply means.

18. A condition responsive circuit including in combination,
first and second actuating input lines and a reference input line,
means to connect said reference line to one or the other of said actuating lines,
voltage supply means having two terminals and including impedance means one of said supply terminals being connected to said reference input line,
first and second resistance-capacitance circuit means each having two terminals, a first terminal of each resistance-capacitance circuit being respectively connected to said first and second actuating input lines,
unidirectional current conducting circuit means respectively connecting said actuating input lines to a common line,
voltage comparison electroresponsive circuit means having an input terminal, an output terminal and a reference terminal, said input terminal being connected to said common line and said reference terminal being connected to said reference line and operative to compare the potential in said actuating lines with the potential on said reference line and responsive to a predetermined difference of potential to supply a first signal and at all other times to supply a second signal at said output terminal, and
load means connected to said voltage supply means and the output terminal of said electroresponsive circuit means and responsive to said first signal to indicate a first electrical condition and to said second signal to indicate a second electrical condition,
the other terminal on both of said resistance-capacitance means being connected to the other terminal of said voltage supply means.

19. A condition responsive circuit operative to indicate a changing condition including in combination,
a pair of actuating lines and a pair of reference lines,
means for connecting an actuating line to a reference line,
first and second voltage storage means respectively connected to said actuating lines and having a common connection,
voltage supply means connected between said reference lines and applying a different potential to each reference line,
a connection from a point on said voltage supply means to said common connection,
said voltage storage means storing electrical voltage respectively in accordance with the electrical connections imposed between any reference line and any actuating line and operative in response to a change in said imposed connections to slowly change the voltage storage therein, and
circuit means including fast responsive electroresponsive switching means connected across said voltage supply means and responsive to a change in current flow in said connection between said common connection and said point on said voltage supply means to indicate by providing a current path that a change in imposed connections had occurred.

References Cited

UNITED STATES PATENTS

| | | | |
|---|---|---|---|
| 2,918,666 | 12/1959 | Brower et al. | 340—195 |
| 3,141,126 | 7/1964 | Bennett et al. | 73—517 |
| 3,295,364 | 1/1967 | Van Dyke | 73—517 |
| 3,372,253 | 3/1968 | Baker et al. | 200—61.45 |

JAMES J. GILL, Primary Examiner

H. GOLDSTEIN, Assistant Examiner

U.S. Cl. X.R.

200—61.45